April 14, 1925.
M. AUDIBERT
1,533,535
FLOWER AND FRUIT GATHERING PINCHING SCISSORS
Filed March 10, 1924
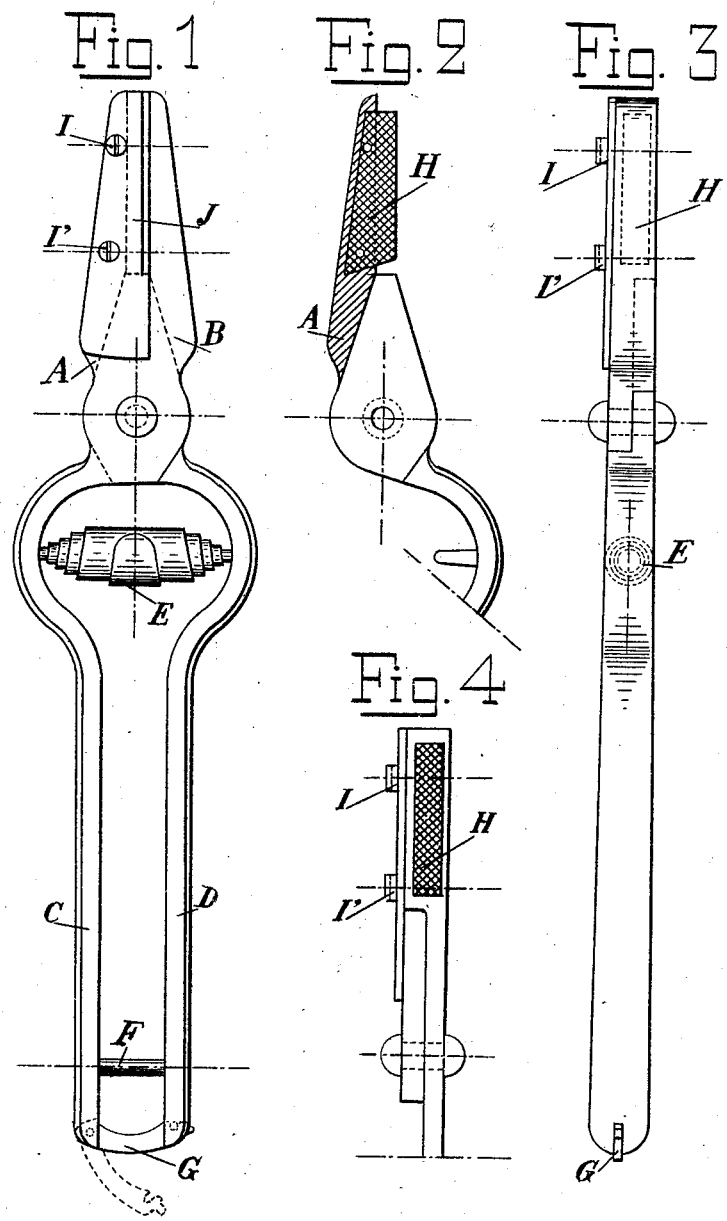
INVENTOR
Marcel Audibert Patented Apr. 14, 1925.

1,533,535

UNITED STATES PATENT OFFICE.

MARCEL AUDIBERT, OF SALON, FRANCE.

FLOWER AND FRUIT GATHERING PINCHING SCISSORS.

Application filed March 10, 1924. Serial No. 698,258.

*To all whom it may concern:*

Be it known that I, MARCEL AUDIBERT, citizen of the Republic of France, residing at Salon, Bouches-du-Rhône, France, have invented new and useful Improvements in Flower and Fruit Gathering Pinching Scissors, of which the following is a specification.

The object of this invention consists in a pinching scissor allowing by its operation to grip before, during and after cutting a flower stem or the pedunculus or a bunch of grapes or of another fruit; the gripping of the product to be collected being obtained by the pressure of the hand upon the pinch allowing to near towards the operator the product without letting it fall to the ground or in the middle of a bush as it unavoidably happens with other ordinary apparatus as scissors, secateurs, knives and the like particularly if the fruit or the flower to be caught are a little away from the hand.

This pressure on the stem or pedunculus is realized by the contact of a resilient body, rubber cork, felt or any other similar substance, the compressibility of which avoids the squashing of the stem; said resilient body being disposed and fixed upon the one jaw of the pinching scissor provided also on the one of its sides with a removable cutting blade insiding and cutting as a secateur the stem of the flower or the pedunculus of the fruit to be gathered.

In the enclosed drawings given as an example of execution of the invention:

Fig. 1 shows in prospection the pinching scissor.

Fig. 2 shows in longitudinal section the one jaw supporting the cutting blade and the resilient pressing body.

Fig. 3 is a side view of the whole apparatus.

Fig. 4 shows in prospect the jaw carrying the cutting blade and the resilient pressing body.

The pinching scissor is composed of two jaws A and B each prolongated by prehension branches C and D carrying the working spring E and at their extremities the abutment F and the locking catch G.

The jaw A is carved out in its thickness to form a lodging for the rubber block H (Figs. 2 and 4) therein contained and held by the ports of the screws I, I' fixing the cutting blade J upon the jaw A; this blade is easily dismountable to allow for its grinding or replacement; it is on the one part flush with the rubber block H with which it moves and forms on the other part of the border of the jaw B forming with the cutter the necessary angle for the correct working of the pinching scissor. When in action the stem or pedunculus is in contact with the jaw B and the resilient rubber block H, the latter is compressed by the effort tending to near the jaws without squashing the stem to be cut whilst the cutting blade operates progressively its incision. According to the cut to be performed the blade must be topwards when gathering raisins or flowers with hanging down stems or pedunculus, whilst it should be downwards when gathering off upwardly going stems; this difference of position of the blade is simply obtained in reversing by hand the pinching scissor.

Having now particularly described and ascertained the nature of my said invention and how the same has to be performed, I declare that what I claim is:

Flower and fruit gathering pinching scissor in which the one jaw only of the pinching scissor is carved out to receive a rubber block flush with a removable cutting blade fixed upon the one face of said jaw by means of screws holding at the same time the rubber block in its lodging, the other massive jaw serving as rest for the rubber block and as the counter piece to the cutting blade contacting with it when cutting.

In testimony whereof I have signed my name to this specification.

MARCEL AUDIBERT.